United States Patent
Beck et al.

(10) Patent No.: US 9,920,878 B2
(45) Date of Patent: Mar. 20, 2018

(54) LUBRICATION SYSTEM AND CONTROLLER

(75) Inventors: David Beck, St. Peters, MO (US);
Nathan Donovan, Columbia, IL (US);
Eric Krassinger, St. Louis, MO (US)

(73) Assignee: LINCOLN INDUSTRIAL CORPORATION, St. Louis, MO (US)

( * ) Notice: Subject to any disclaimer, the term of this patent is extended or adjusted under 35 U.S.C. 154(b) by 1305 days.

(21) Appl. No.: 13/451,871

(22) Filed: Apr. 20, 2012

(65) Prior Publication Data

US 2013/0277148 A1    Oct. 24, 2013

(51) Int. Cl.
*F16N 29/02* (2006.01)
*F16N 7/38* (2006.01)

(52) U.S. Cl.
CPC ............. *F16N 29/02* (2013.01); *F16N 7/385* (2013.01); *F16N 2230/02* (2013.01)

(58) Field of Classification Search
CPC .......... F16N 29/00; F16N 29/02; F16N 29/04; B60R 17/02
USPC .................... 184/6.1, 6.4, 7.4, 39.1; 700/282
See application file for complete search history.

(56) References Cited

U.S. PATENT DOCUMENTS

| | | | | |
|---|---|---|---|---|
| 4,064,455 A * | 12/1977 | Hopkins et al. | ............... | 324/663 |
| 4,445,168 A * | 4/1984 | Petryszyn | ........................ | 700/21 |
| 4,674,030 A * | 6/1987 | Gabriel et al. | .................. | 700/79 |
| 4,967,881 A * | 11/1990 | Meuer et al. | .................. | 184/7.4 |
| 5,038,893 A * | 8/1991 | Willner et al. | ................. | 184/7.4 |
| 5,125,480 A * | 6/1992 | Gregory et al. | ............. | 184/6.26 |
| 5,182,720 A * | 1/1993 | Beck et al. | .................... | 700/282 |
| 5,228,469 A * | 7/1993 | Otten et al. | ...................... | 137/80 |
| 5,295,083 A * | 3/1994 | Yano et al. | .................... | 700/282 |
| 5,310,020 A * | 5/1994 | Martin et al. | .................. | 184/6.3 |
| 5,482,138 A * | 1/1996 | Mori et al. | ..................... | 184/6.4 |
| 5,495,917 A * | 3/1996 | Pax | ................................. | 184/7.4 |
| 5,612,890 A * | 3/1997 | Strasser et al. | ................ | 700/241 |
| 5,823,295 A * | 10/1998 | Griffith et al. | ................. | 184/6.4 |
| 5,835,372 A * | 11/1998 | Roys et al. | .................... | 702/105 |
| 6,317,656 B1 * | 11/2001 | Kira | .............................. | 700/282 |
| 6,567,710 B1 * | 5/2003 | Boelkins | ........................ | 700/46 |

(Continued)

OTHER PUBLICATIONS

What is Firmware_Webopedia.pdf, Apr. 15, 2015.*
What is microprocessor (logic chip)_—Defintion from WhatIs.pdf, Apr. 15, 2015.*

*Primary Examiner* — Minh Truong
(74) *Attorney, Agent, or Firm* — Bryan Peckjian; SKF USA Inc. Patent Dept.

(57) ABSTRACT

A lubrication system for lubricating bearings that includes at least one lubrication pump for pumping lubricant to the bearings and at least one metering valve for distributing the pumped lubricant throughout the lubrication system to the bearings. The system further includes a lubrication controller in communication with the at least one lubrication pump and at least one metering valve for controlling the lubrication system. The controller has firmware configured to provide a sequence of instructions to perform specified tasks and hardware that carries out the sequence of instructions to perform the specified tasks. In an unconfigured and unconnected state, the lubrication controller can be configured by reprogramming the firmware, to selectively control at least one of a series progressive lubrication system, a dual line lubrication system and a single line parallel lubrication system.

1 Claim, 8 Drawing Sheets

(56) References Cited

U.S. PATENT DOCUMENTS

| | | |
|---|---|---|
| 6,705,432 B2 * | 3/2004 | Conley et al. .................. 184/7.4 |
| 6,850,849 B1 * | 2/2005 | Roys ................................ 702/45 |
| 7,905,710 B2 * | 3/2011 | Wang et al. .................... 417/18 |
| 2002/0019586 A1 * | 2/2002 | Teller et al. ................... 600/300 |
| 2002/0063018 A1 * | 5/2002 | Schippers .................... 184/15.1 |
| 2002/0157901 A1 | 10/2002 | Kast et al. |
| 2002/0183802 A1 * | 12/2002 | Fang et al. ...................... 607/48 |
| 2003/0212897 A1 * | 11/2003 | Dickerson et al. ........... 713/200 |
| 2008/0303691 A1 * | 12/2008 | Krassinger ............... 340/825.52 |
| 2009/0299535 A1 | 12/2009 | Delaloye |
| 2010/0147627 A1 * | 6/2010 | Lakomiak et al. ............ 184/7.4 |
| 2010/0211349 A1 * | 8/2010 | Flaction et al. .............. 702/141 |
| 2011/0173457 A1 * | 7/2011 | Reh ................................ 713/191 |
| 2011/0279261 A1 * | 11/2011 | Gauger et al. ............. 340/539.1 |
| 2012/0132303 A1 | 5/2012 | Conley et al. |
| 2012/0132483 A1 * | 5/2012 | Conley et al. .................. 184/6.4 |

\* cited by examiner

LUBRICATION SYSTEM AND CONTROLLER

FIELD OF THE INVENTION

The present disclosure generally relates to a lubrication system. More particularly, the present disclosure relates to a lubrication system having a lubrication controller that can be configured through firmware to selectively control multiple types of lubrication systems.

BACKGROUND OF THE INVENTION

The present invention provides a lubrication system having a lubrication controller that can be configured through firmware to selectively control multiple types of lubrication systems. There are two basic uses for the system and controller that include both industrial and mobile applications. The first application has AC noise protection and output relays designed for the industrial market. The latter application includes DC noise protection and output relays designed for the mobile market.

As disclosed in the "*Handbook of Lubrication and Tribology*," Volume 1 Application and Maintenance, $2^{nd}$ Edition, the purpose of lubrication is to prevent metal to metal contact between two moving members, reduce friction, remove heat, and flush out contaminants. The philosophy of an automatic lubrication system is to deliver the right amount of lubricant at the right time. The method to do this is to deliver small quantity of lubricant to a bearing often. The lubricant is delivered in small portions as the bearing consumes it. Applying more lubricant than the bearing can consume in a short period of time is often thrown off the moving components, causing housekeeping and environmental safety hazards. A properly designed automatic centralized system can deliver just the right amount of lubricant the bearing needs.

The purpose of any centralized lubrication system is to provide the correct amount of grease to the bearing at the right time. The method to do this is for a controller to turn on a pump that supplies grease to positive displacement valves that will dispense a predetermined amount of grease to a bearing. The monitoring of system performance is key. This can be done with simple visual indicators or transducer feedback.

The present invention accomplishes the key component of monitoring a properly designed centralized lubrication system through the use of a novel multi-configurable controller that enables an end user to select a single piece of controller hardware and configure it via firmware for their specific application.

SUMMARY OF THE INVENTION

The basic inventive concept provides a lubrication system for lubricating bearings.
A first aspect of the present invention provides a lubrication system comprising:
 at least one lubrication pump for pumping lubricant to the bearings, and
 at least one metering valve for distributing the pumped lubricant throughout the lubrication system to the bearings, and
 a lubrication controller in communication with the at least one lubrication pump and at least one metering valve for controlling the lubrication system and having firmware configured to provide a sequence of instructions to perform specified tasks and hardware that carries out the sequence of instructions to perform the specified tasks, and wherein in an unconfigured and unconnected state, the lubrication controller can be configured by reprogramming the firmware to selectively control at least one of a series progressive lubrication system, a dual line lubrication system and a single line parallel lubrication system.

In a second aspect of the present invention the controller includes a USB port used to reflash the firmware.

In a third aspect of the present invention the lubrication system further includes at least one flow sensor and at least one pressure sensor, the flow and pressure sensors for sending feedback signals to the controller.

In another aspect of the present invention the controller is responsive to the respective flow and pressure sensor feedback signals and provides instructions to the lubrication pump and the at least one metering valve based on the feedback signals.

In yet another aspect of the present invention the lubrication system has at least one I/O device configured to interface with another information processing system and a power supply to drive the lubrication controller and the at least one I/O device.

In yet another aspect of the present invention the lubrication system providing a computer remotely connected to the lubrication controller and including PC software loaded into the computer, the PC software and computer combination used to both simulate the lubrication system and program the lubrication system.

In yet another aspect of the present invention the computer is used to download a history data log of the lubrication system.

In yet another aspect of the present invention the I/O device accommodates multiple inputs and multiple outputs.

In yet another aspect of the present invention the multiple inputs include at least one of a pressure sensor/transducer at pump, a pressure sensor/transducer at end of line, a low level, a count switch, a remote manual lube, a standby/ignition switch and a secondary timer.

In yet another aspect of the present invention the multiple outputs include at least one of a post spray, an air to pump solenoid and an alarm.

In yet another aspect of the present invention the lubrication controller further provides at least one communication port, the communication port to be used to connect with at least one of a remote sensor controller and a slave controller.

In yet another aspect of the present invention the lubrication system further includes the air valve being connected to the controller, and wherein the lubrication controller sends signals to the air valve to open and close.

In yet another aspect of the present invention the at least one valve provides at least one of a dual line metering valve and a change over valve.

In yet another aspect of the present invention the lubrication controller further provides an In-Cab display.

In yet another aspect of the present invention the communications port may be used for I/O expansion.

In yet another aspect of the present invention the communications port may be used for the remote controller to monitor bearings using lube sensors.

In yet another aspect of the present invention the communications port can integrate with factory automation systems.

In yet another aspect of the present invention the communications port can integrate with a PLC.

In yet another aspect of the present invention the In-Cab display further comprises:

at least two LED indicators for indicating low level and system failure, an at least 3 digit display for selecting selected interval mode, timer operation, pump cycle and error codes, and wherein the display can be used to set up a mode of operation, and wherein the mode of operation set up includes at least one of a selection of a mode, a manual cycle and a reset system.

In a final aspect of the present invention a remote sensor controller may be connected to the lubrication controller, the remote sensor controller allowing the addition of extra lubrication sensors without expanding the size of the system lubrication controller.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
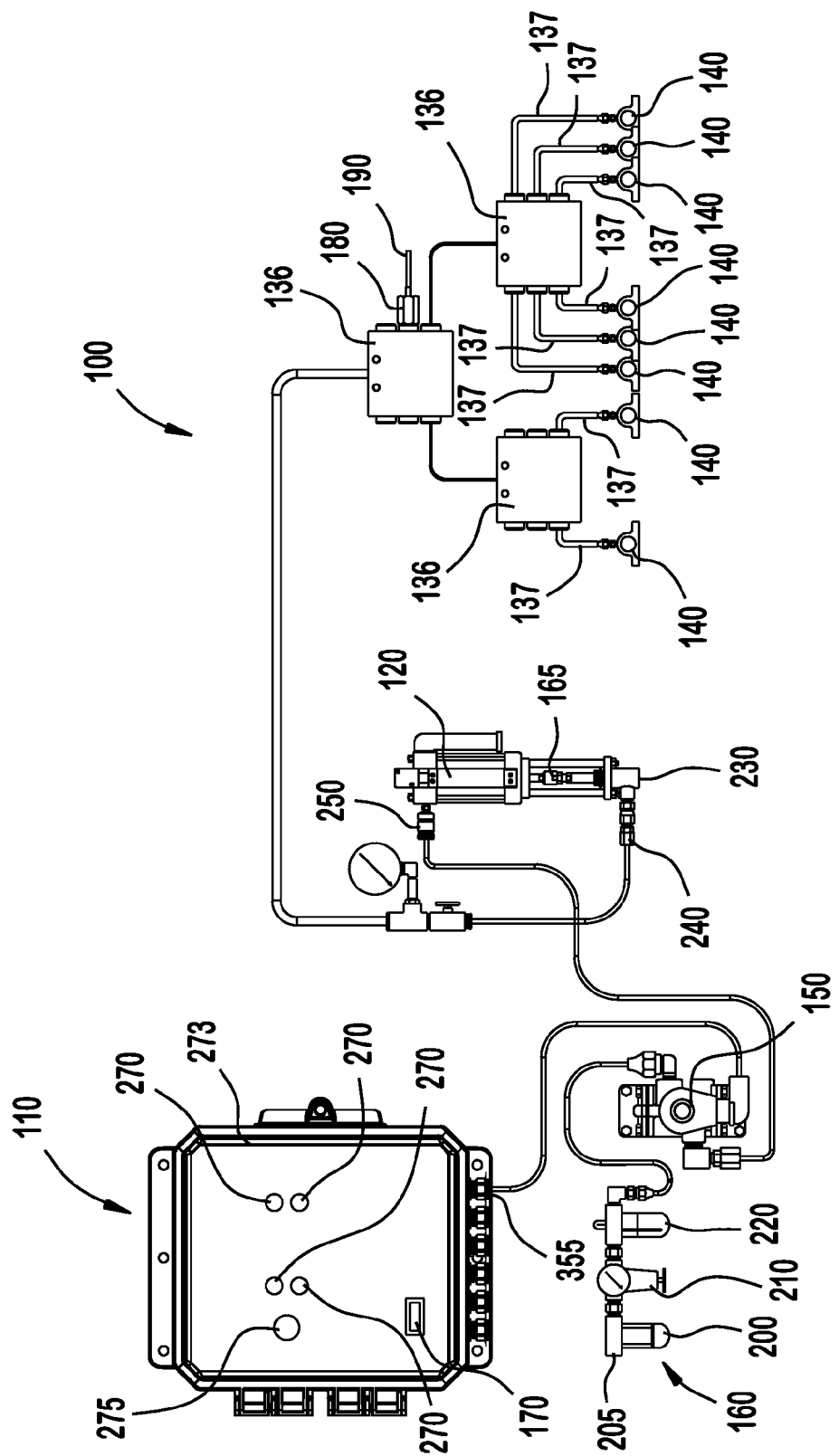
FIG. 1 is a top plan view of a centralized lubrication system and controller according to a first preferred embodiment of the present invention.

A first embodiment of an inventive lubrication system 100 for lubricating bearings 140 is illustrated in FIG. 1. The bearings 140 are typically disposed in any type of rotating industrial or commercial machinery. Lubrication system 100 minimally includes at least one lubrication pump 120 and at least one divider metering valve 136. These components are the basic building blocks of the lubrication system. In this first embodiment, the at least one divider metering valve provides three divider metering valves 136. The lubrication pump 120 pumps lubricant from a reservoir (not shown) towards the bearings 140. The pumped lubricant passes through the first divider metering valve 136 which further distributes the pumped lubricant into and past the last two divider metering valves 136 on to the bearings 140.

The lubrication system 100 also provides a basic low cost lubrication controller 110. Lubrication controller 110 controls the function of the lubrication system 100. Now referring to FIGS. 1 and 2, the lubrication controller 110 includes firmware 112 that provides a sequence of instructions 115 to perform specified tasks 113 and hardware 114 that carries out the sequence of instructions 115 to perform the specified tasks. To simplify reprogramming the firmware 112, the inventive lubrication system 100 may further include an onboard USB port 170. The onboard USB port 170 allows a user to simply reflash the firmware 112 by inserting a portable drive 175 loaded with the updated firmware 112. The updated firmware is selected based on the desired lubrication system configuration. The hardware 114 may include a memory 118 that stores a data log of information 390 regarding the length and quantity of lubrication events. The data log of information 390 can be used to verify that the proper quantity of lubrication has been dispensed given the conditions. An operator can then intelligently make adjustments to controller 110 pump on-times as required.

The true value of the present invention is in the flexibility of the lubrication controller 110. The flexibility of the lubrication controller 110 lies in the firmware 112 that can alternatively be selected and the hardware 114 that comes standard with the controller 110. That is, the controller 110 can be programmed via the firmware 112 to selectively control multiple types of lubrication systems without changing the hardware 114. Furthermore, the hardware 114 selected is universal and can easily be added on to and built upon. This keeps the cost of the basic controller down, but allows for easy reconfiguration if desired. As described in the first preferred embodiment of FIG. 1, the lubrication controller 100 is configured to control a "Progressive Lubrication System."

Basic Progressive Lubrication System 100 may also provide an air solenoid valve 150 and an air supply inlet assembly 160 that is in communication with air valve 150. Air supply inlet assembly 160 may further include a contaminant filter 200, a pressure regulator 210 and an air line lubricator 220 respectively connected together. A compressed air supply (not shown) is provided on an inlet side 205 of the air supply assembly 160. The air supply 160 drives the lubrication pump 120. The air solenoid valve 150 receives its commands to open and close from the lubrication controller 110.

Figure 2:
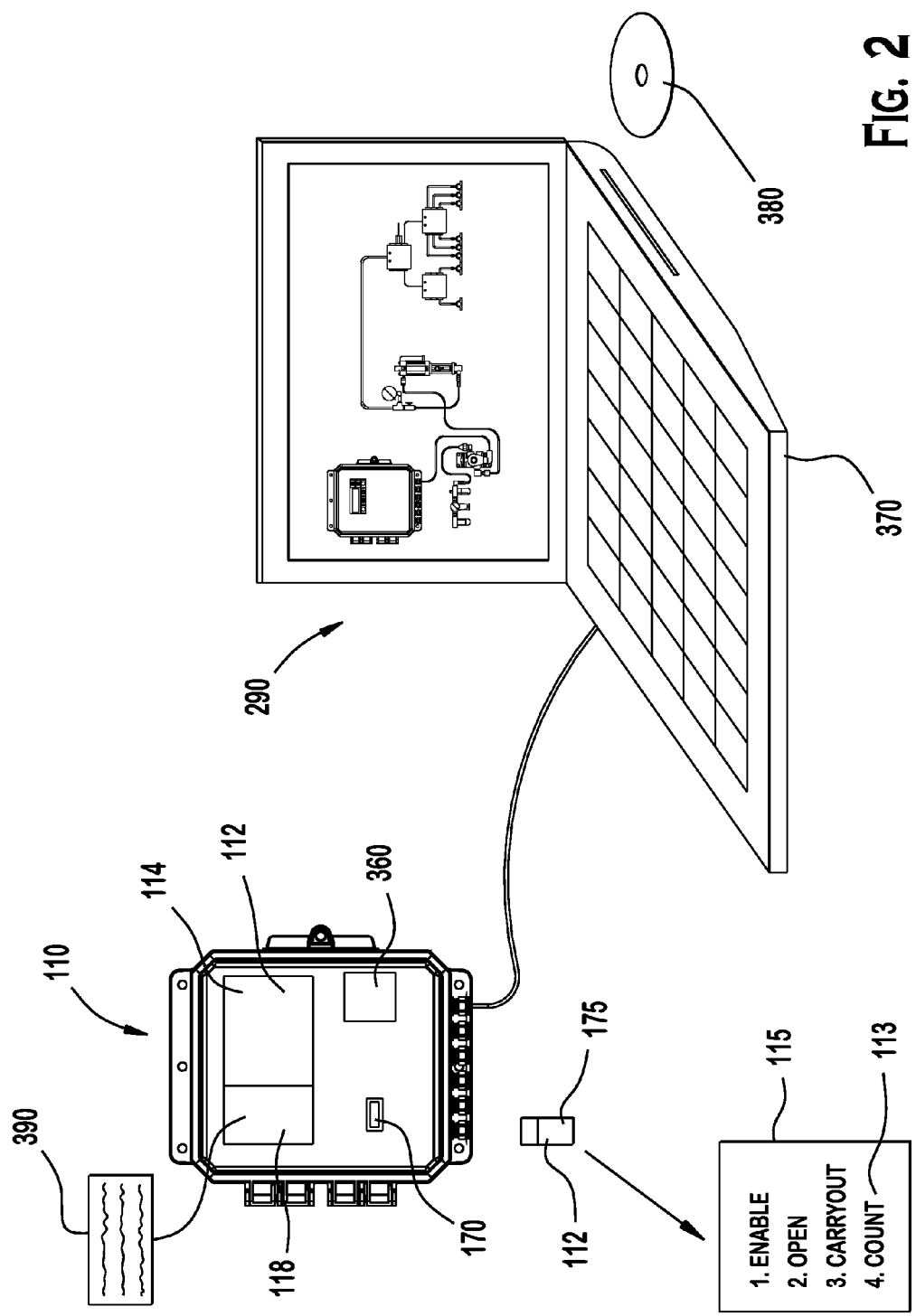
FIG. 2 is a perspective view of a computer arrangement remotely connected to the controller used to simulate and program a desired lubrication system according to the first preferred embodiment of the present invention.
Figure 3:
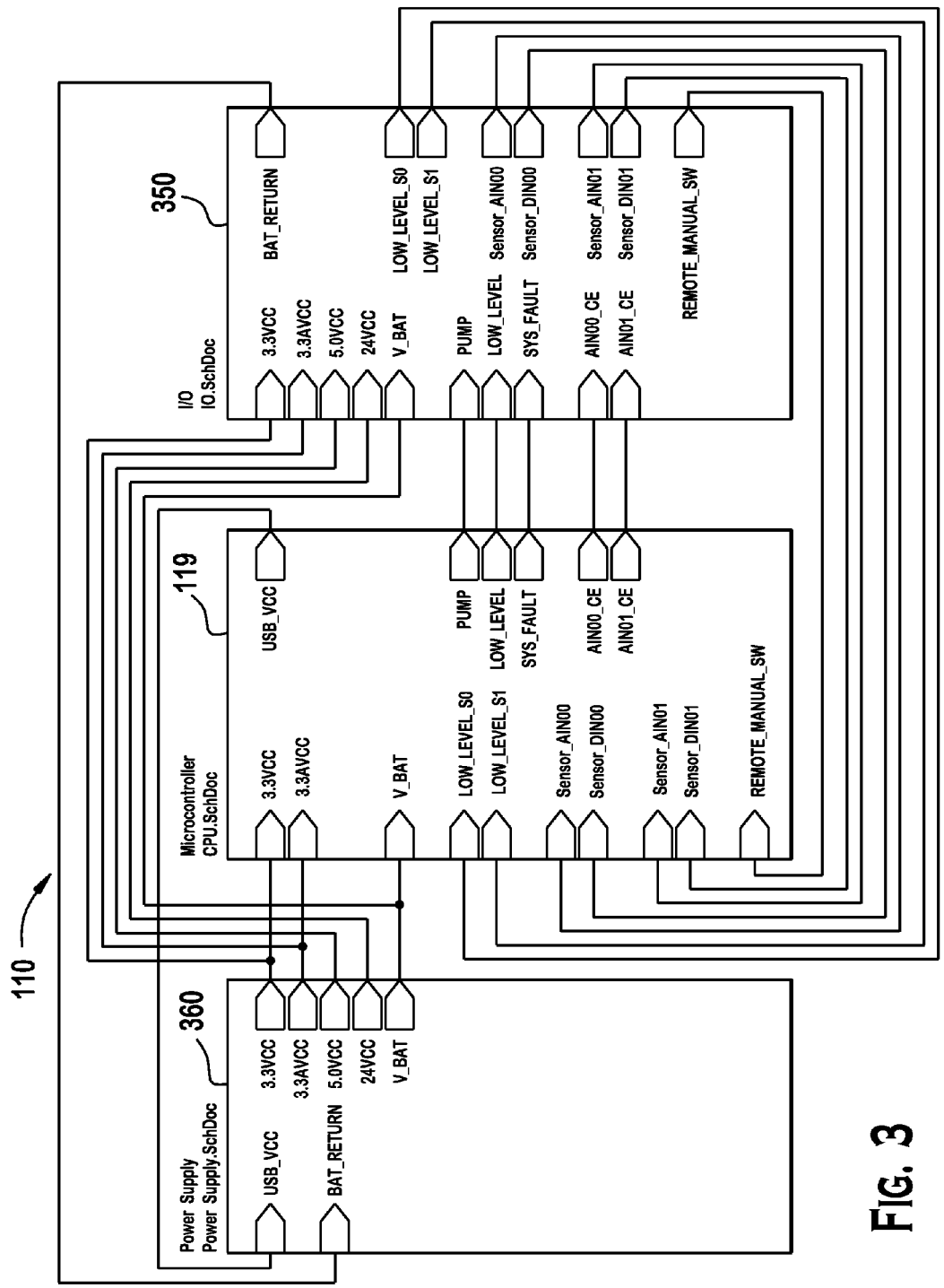
FIG. 3 is a top plan view of the internal layout of the controller hardware according to the first preferred embodiment of the present invention.

Now referring to FIGS. 1-3, the controller 110 may also include a power supply 360. The power supply 360 drives a CPU 119 and the at least one I/O device 350. Lubrication Controller 110 sends a signal through the at least one I/O device 350 to energize the air solenoid valve 150. When the air solenoid valve 150 is energized, compressed air flows through the air supply assembly 160, air solenoid valve and on to the lubrication pump drive port 250. The lubrication pump 120 shown in this embodiment is a pneumatically reciprocating piston pump, but those skilled in the art will recognize that an electrically or hydraulically driven pump may be employed.

A reciprocating piston 165 disposed within the lubrication pump 120 draws in lubricant (not show) during an inlet stroke of the lubrication pump 120. The lubrication, which is typically stored in a reservoir or tank, flows through a lubrication inlet port 230 and into a piston cylinder within the pump 120. The reciprocating piston 165 then drives the lubricant out of the piston cylinder through outlet 240 towards first divider metering valve 136 during an outlet stroke. The first divider metering valve 136 meters the lubricant in proper desired proportions to the last two divider metering valves 136. The last two divider metering valves 136 further meter the lubricant directly to the bearings 140 through bearing lubrication lines 137.

The desired lubrication system proportions are determined by the system design requirements and are either preset from the factory or adjusted during on-site system set up. The design requirements for proper bearing lubrication are determined by a number of factors. Those factors include, but are not limited to, the bearing RPM, run-time, temperature, vibration, size, orientation, amount of external contamination and load.

The divider metering valve 136 cycles back and forth while it meters and displaces the lubricant. An output volume provided by the displacement of the divider metering valves 136 determines the amount of lubrication that ultimately flows to the bearing(s) 140. The divider metering valves 136 can be cycled once or multiple times to deliver an appropriate amount of grease to the bearing(s) during an interval event. A cycle switch 180 is in mechanical communication with the first divider metering valve 136. The cycle switch 180 communicates the number of successive cycles the first metering valve 136 completes during the interval to the controller 110 via a cycle switch feedback line 190. This feedback allows the controller 110 to calculate whether the air solenoid 150 should be kept open longer to effect additional reciprocating piston 165 strokes. The number of piston 165 strokes in conjunction with the on-time selection programmed into the controller determines the total amount of lubrication delivered to the bearings 140.

The low cost controller 110 of Basic Progressive Lubrication System 100 requires a computer 370 to select the input programming parameters and lubrication programs. There is no operator interface or keypad/display in this embodiment. However, there are at least 2 LED indicators 270 for indicating the status of system conditions such as low level and system failure mounted to a front cover 273 of the controller 110. There are 4 LED indicators shown in this embodiment. The controller 110 may also include a manual lube push-button 275 for actuating a manual lube cycle by an operator.

The required computer 370 could be a laptop for ease of mobility or a PC that is remotely connected to the lubrication controller 110. The controller 110 also includes PC software 380 that is specifically designed for the controller 110. The PC software 380 is pre-loaded into the computer 370 before programming. The PC software 380 and computer 370 combination are used to both simulate the desired lubrication system configuration and program the simulated lubrication system configuration.

Figure 4:
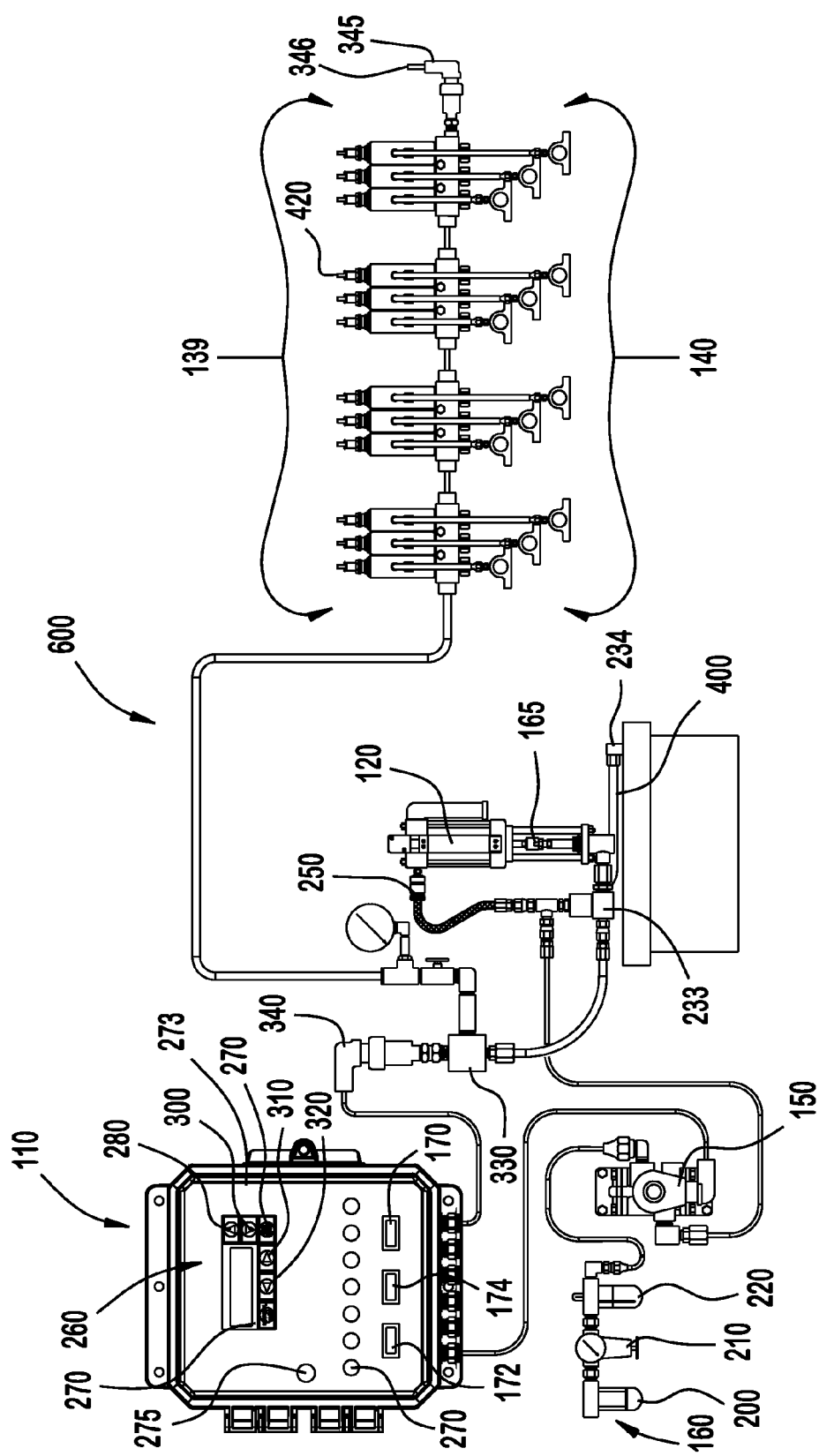
FIG. 4 is a top plan view of a single line lubrication system according to a second preferred embodiment of the present invention.

There is shown in FIG. 4, a Single Line Lubrication System 600 according to a second preferred embodiment of the present invention. Many features of the Single Line Lubrication System 600 are the same as were disclosed in the Progressive Lubrication System 100. Consequently, the description of those elements will not be re-introduced in this embodiment or other embodiments henceforth disclosed.

The operation of the Single Line Lubrication System 600 will now be disclosed. When lubricant is needed, the controller 110 opens the air solenoid 150 to turn on the pump 120. The pump 120 produces flow and builds up pressure in the line. When the pressure reaches a predetermined level, for example 1800 psig, one of the injectors 139 operates and meters a predetermined amount of lubricant to at least one bearing 140.

A pressure switch or transducer 345 usually located farthest away from the pump senses when the pressure has reached 1800 psig. Once the pressure is reached, the pressure switch or transducer 345 sends a signal via the pressure feedback line 346 to the controller 110 indicating that the system pressure was achieved. The controller then turns off the air solenoid valve and thus the air supply to the pump.

For pneumatically or hydraulically operated pumps, when the air/hydraulic supply is turned off, a 3-way valve 233 is activated, which directs any excess grease due to line expansion directly back to the reservoir through vent return port 234. For electrical operation, the controller 110 will shut off electric power to a 3-way vent valve 233. The pressure in the system can then be bled off venting the grease back to its reservoir.

When the lubrication system 600 is turned on, the 3-way valve is positioned to allow grease to flow to the injectors and thus to the bearings 140. After the injectors 139 have metered the correct amount of grease to the bearings 140, the system is shut off by the controller 110 turning off the pump. The 3-way valve is then shifted in a manner that bypasses the pump and redirects the grease back to the container, which is normally under atmospheric pressure only. This allows the line to bleed off the grease pressure or vent, thus allowing the injectors to reset and be ready for the next lube event. The vent valve can be operated pneumatically, hydraulically, or electrically depending on the power source that the pump uses. Each injector 139 can be manually adjusted to discharge the precise amount of lubricant each bearing needs.

A single injector 139 can be mounted to lubricate one bearing, or grouped in a manifold with feed lines supplying lubricant to multiple bearings as shown in FIG. 4. In each case, injectors supplied with lubricant under pump pressure, pump lubricant through a single supply line. The lubrication system 600 may further comprise at least one flow sensor 330. The at least one flow 330 sensor provides feedback signals to the controller 110 regarding the flow of lubricant to the bearings 140. The controller 110 is responsive to the respective flow and other pressure sensor feedback signals and provides instructions to the lubrication pump 120 and the metering valves 136 based on the feedback signals.

Figure 4A:
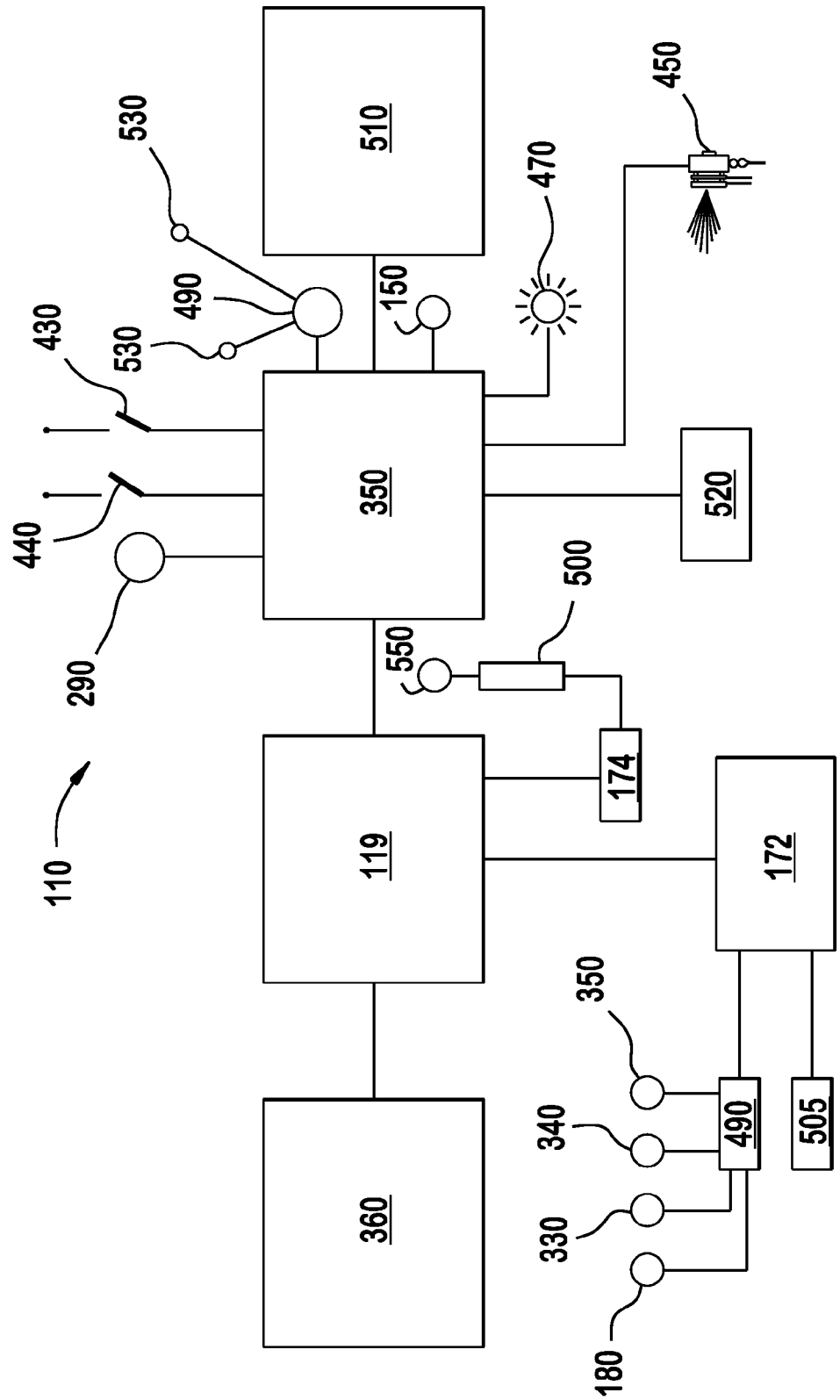
FIG. 4A is a block diagram of the various components that make up the controller of FIG. 4.

As shown in FIG. 4A, the controller 110 of lubrication system 600 may also provide at least one I/O device 350. The I/O device 350 is configured to interface with other information processing systems such as the computer arrangement 290, a PLC 520, a factory automation system 510 or a bearing monitoring system through a remote sensor controller 490 and sensors 530. As shown in FIG. 4, the at least one I/O device 350 is connected to one of the information processing systems via at least one cable connection disposed on the controller 110. As shown in FIG. 4A, the controller 110 may also include a power supply 360. The power supply 360 drives a CPU 119 and the at least one I/O device 350.

In addition to the USB port 170 the controller may provide at least two communication ports 172 and 174. Communication port 172 may be used to monitor bearings using additional lube sensors via a flow sensor controller 490. Here, the flow sensor controller 490 detects if grease has reached the bearing. The remote sensor controller 490 allows the addition of extra lubrication sensors 180, 330, 340 and/or 350 without expanding the hardware of the main system lubrication controller 110. Alternately, communication port 172 can integrate with an I/O expansion controller. This allows an operator to control another pump or lubrication zone from the main controller 110. Communications port 174 can be used to communicate with factory automation systems or with a PLC 550 through a remote slave controller 500.

The I/O device 350 may accommodate multiple inputs and multiple outputs. The multiple inputs may include at least one of the pressure sensor/transducer at pump 340, a pressure sensor/transducer at end of line 345, a low level 400, a count/cycle switch 180, a remote manual lube 420, a standby/ignition switch 430 and a secondary timer 440. The multiple outputs include at least one of a post spray 450, the air solenoid valve 150 and an alarm 470.

The controller 110 also provides an In-Cab display 260 mounted on the front cover 273. In addition to the display 260, at least two LED status indicators 270 also mounted to the front cover 273, are provided to indicate low lubricant level and system failure. Here, the controller 110 provides 7 LED indicators and a manual lubrication push-button 275.

An at least 3 digit display 245 is provided for selecting the selected interval mode, timer operation, pump cycle and error codes. The display 260 can also be used to set up a mode of operation. The mode of operation set up includes at least one of a selection of a mode, a manual cycle and a reset system. The display 260 may also be used to obtain real time operation updates and alarm 470 notifications.

Here, user-programming can be accomplished two ways. The controller 110 can be programmed through the USB port 170 using the laptop computer 370 or the keypad display 260 located on the controller cover 273. There is both data logging and history reporting capability using the USB port 170 to laptop 370.

Figure 5:
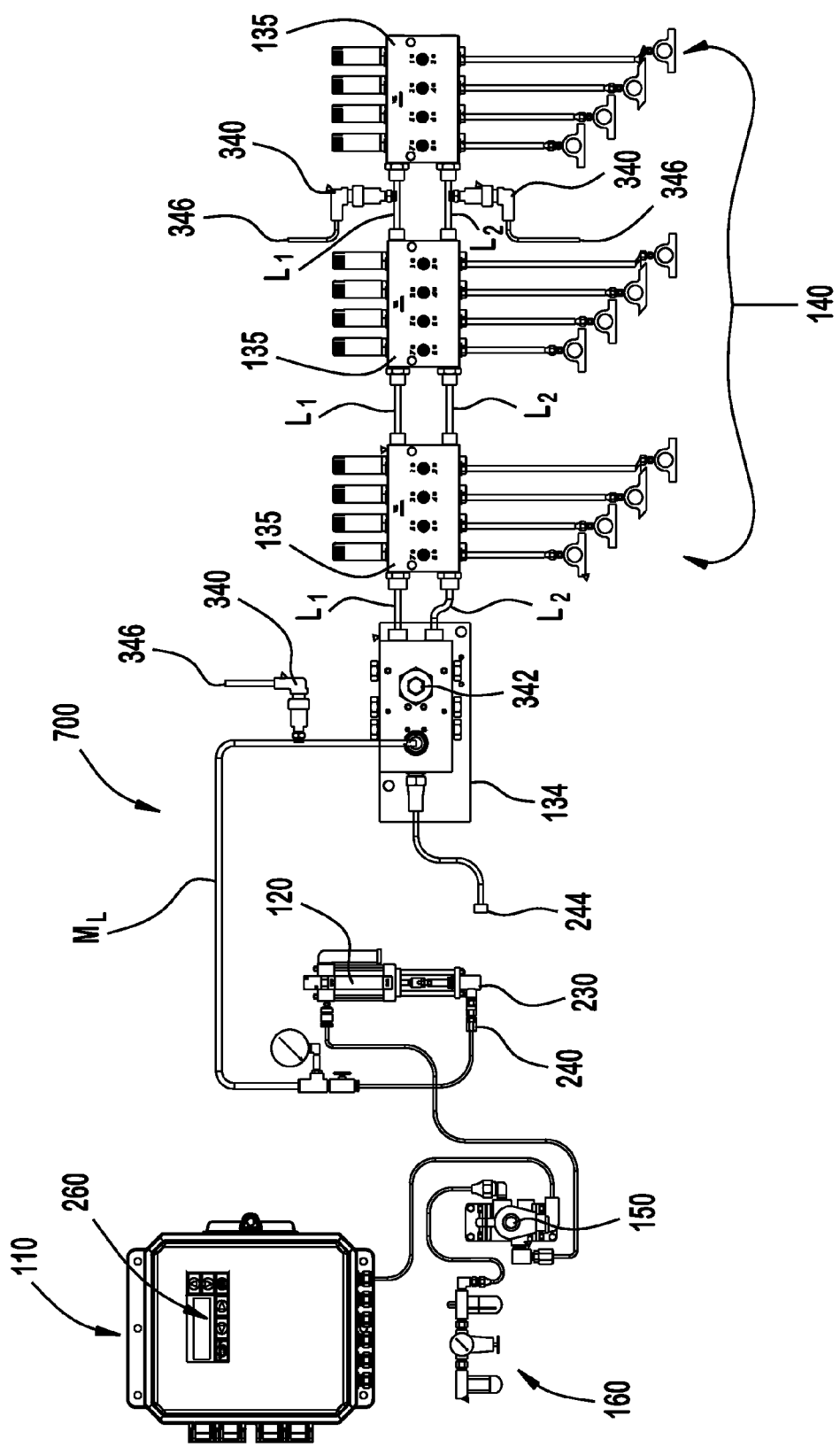
FIG. 5 is a top plan view of a single pump dual line lubrication system according to a third preferred embodiment of the present invention.

There is shown in FIG. 5, a Dual Line Lubrication System 700 according to a third preferred embodiment of the present invention. As the name suggests, two main lubrication lines $L_1$ and $L_2$ are used to set up, install, and operate the lubrication system 700. Correctly designed, the Dual-Line system 700 can handle long lines, relatively high pressure, and hundreds of lubrication points.

In Dual-Line system 700, the pump 120 supplies the lubricant to a change over valve 134. From the change over valve 134, lubricant is supplied alternately into one of the two main lines $L_1$ and $L_2$. Dual-Line systems 700 can be combined with progressive single line measuring valves 130 as well. Oil or viscous grease lubricants will function properly within this system. The Dual-Line lubrication system 700 works in two cycles. The central lubrication pump 120 supplies the lubricant under pressure to main line ML through the reversing 4-way valve. Main line $L_2$ is connected to the reservoir. The metering valves 135 are connected to the main supply lines $L_1$ and $L_2$. The lubricant is dispensed under pressure from one side of the metering valves 135 to the point of application. As soon as the lubricant is dispensed from the last metering valve 135, the first half of the cycle is complete. The lubrication pump 120 will continue to operate, pressurizing the $L_1$ line to the preset pressure. As soon as the preset pressure is reached, the change over valve 134 will switch the lubricant supply to the main line $L_2$ connecting main line ML to the reservoir via return port 244.

Now, the pump 120 that supplies the lubricant under pressure to the main line $L_2$. Line $L_1$ is connected to the reservoir where the pressure is relieved. The lubricant will be dispensed from the metering valves to the at least one bearing 140. Second half cycle is complete as soon as the lubricant is dispensed from the last metering valve 135. The pump 120 will continue to operate until the preset pressure has been reached. At this point, a signal from the end-of-line pressure switch 340 or from a micro switch 342 on the change over valve 134 will stop the pump, turning the system 700 off.

Figure 6:
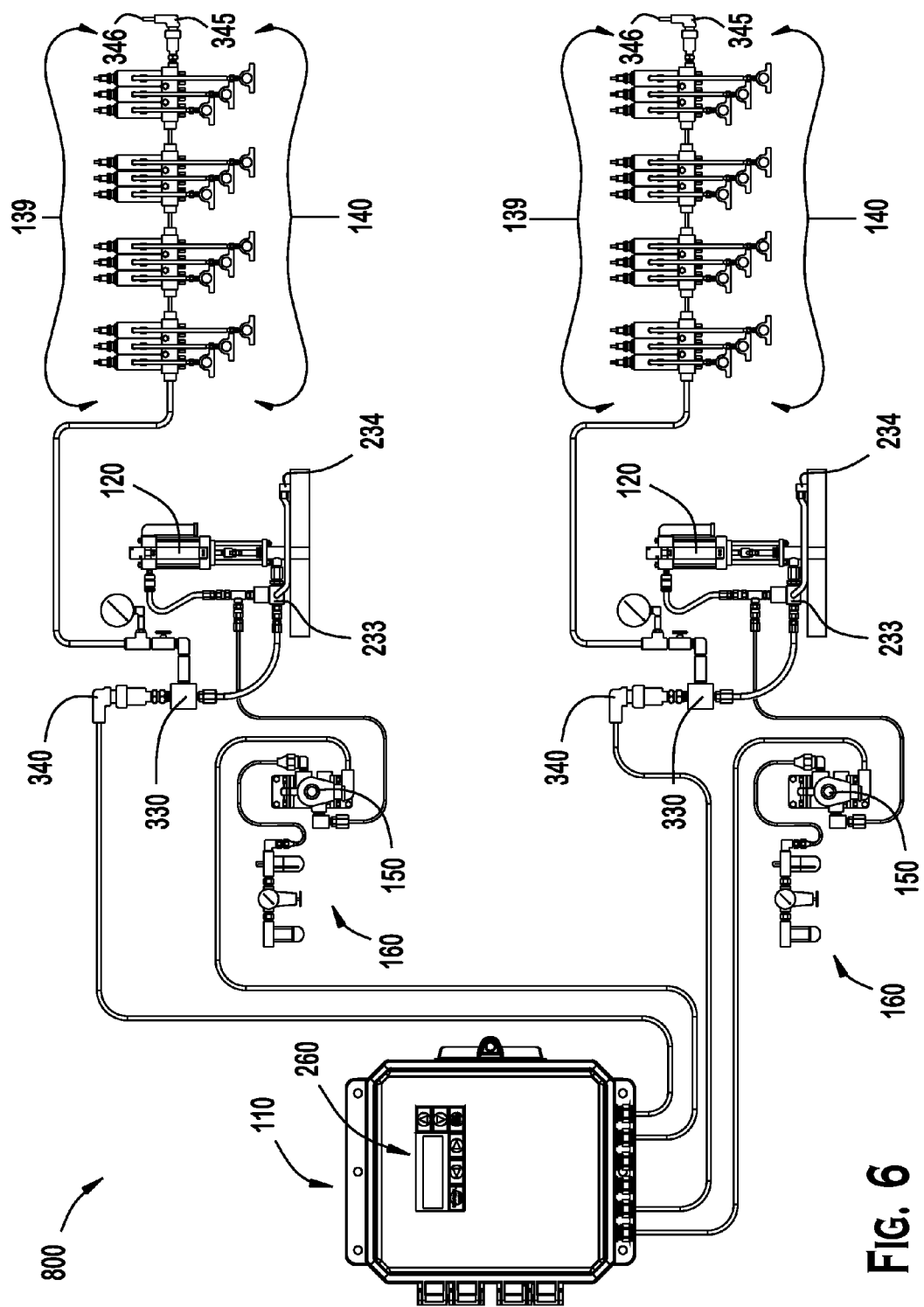
FIG. 6 is a top plan view of a dual line lubrication system according to a fourth preferred embodiment of the present invention.

There is shown in FIG. 6, a Two Pump Single Line Lubrication System 800 according to a fourth preferred embodiment of the present invention. Two pump 120 single line lubrication system 800 operates just like the (One Pump) Single Line Lubrication system 600 except there are two sets of single line lubrication systems 600 configured in parallel with respect to the controller 110. Here, the controller 110 has the necessary I/O 350 to receive feedback from both sets of pressure sensors 340 and 345. The controller 110 drives the each of the separate parallel systems based on the feedback independently as the requirements for lubrication varies from one system to another.

Figure 7:
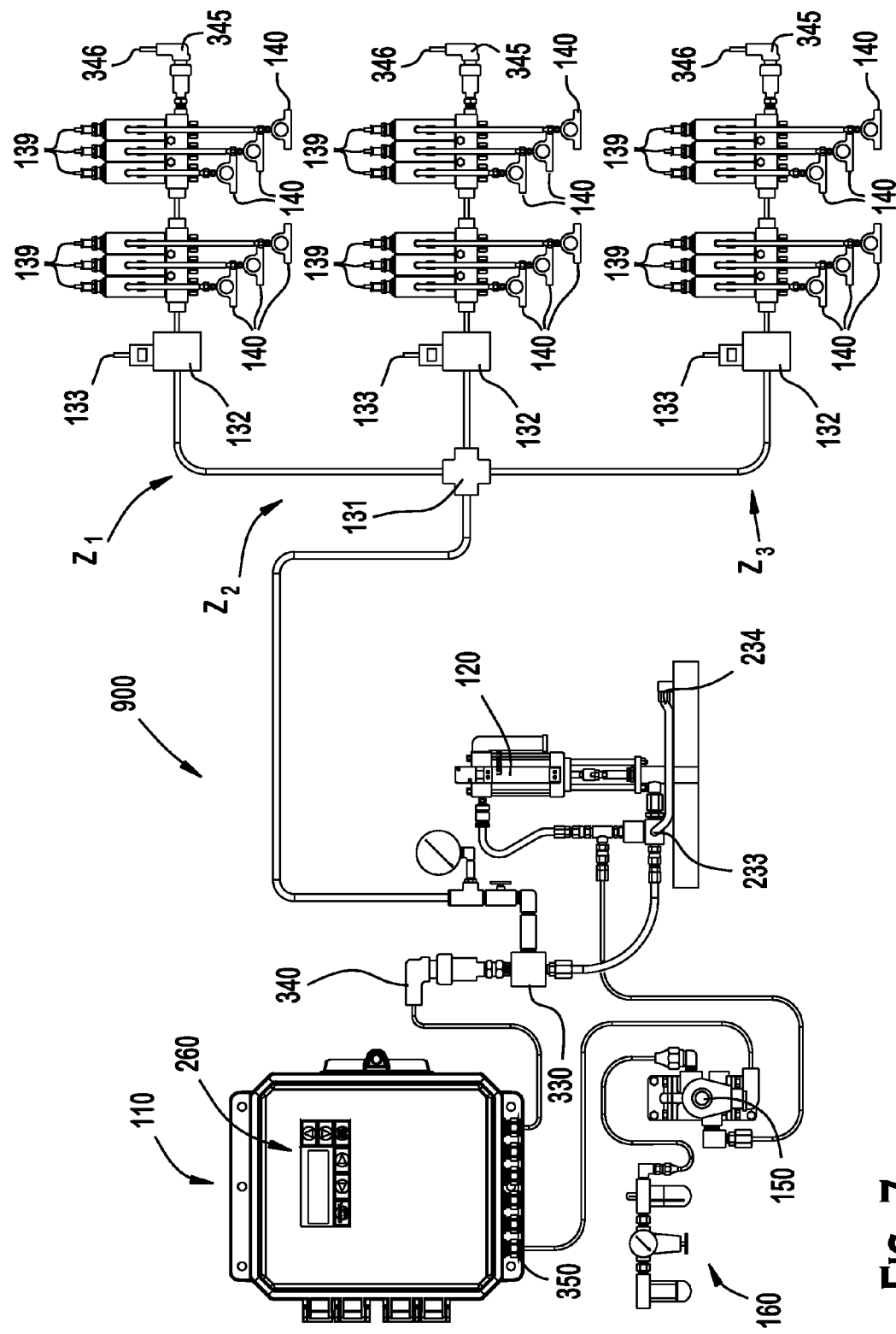
FIG. 7 is a top plan view of a zoned single line lubrication system according to a fifth preferred embodiment of the present invention.

There is shown in FIG. 7, a Zoned Single Line Lubrication System 900 according to a fifth preferred embodiment of the present invention. Zoned Single Line Lubrication System 900 is of course, similar to a single line lubrication system 600, but has separate zones of operation. In this case, there are 3 separate zones $Z_1$, $Z_2$ and $Z_3$. Zoned Single Line Lubrication System 900 has only one pump 120 that can independently drive the three different zones. When the controller 110 is programmed to deliver lubricant to one of the zones, for example $Z_1$, the shut of valves 132 in line with $Z_2$ and $Z_3$ are de-energized and effectively closed off. In this case, lubricant is pumped through cross-tee 131 and only to the bearings of $Z_1$. In this way, the controller 110 can direct lubricant to all of the zones or any combination thereof.

As previously disclosed, the real value of the present invention is in the flexibility of the lubrication controller 110. The flexibility of the lubrication controller 110 lies in the firmware 112 that can alternatively be selected, and the hardware 114 that comes standard with the controller 110. That is, the controller 110 can be programmed via the firmware 112 to at least selectively control the preferred embodiments of lubrication systems without changing the hardware 114. Furthermore, the hardware 114 selected is universal and can easily be added on to and built upon. This keeps the cost of the basic controller down, but allows for easy reconfiguration if desired.

Since many modifications, variations, and changes in detail can be made to the five described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

LUBRICATION SYSTEM AND CONTROLLER ELEMENTS LIST

| | |
|---|---|
| Lubrication Assembly | 100 |
| Lubrication Controller | 110 |
| Firmware | 112 |
| Specific Tasks | 113 |
| Hardware | 114 |
| Sequence of Instructions | 115 |
| Memory | 118 |
| CPU | 119 |
| Lubrication Pump | 120 |
| Cross-Tee | 131 |
| Shut-Off Valve | 132 |
| Power on/off Shut-Off Valve | 133 |
| Cross-Over Valve | 134 |
| Dual Line Metering Valve | 135 |
| Divider Metering Valve | 136 |
| Bearing Lubrication Line | 137 |
| Injector | 139 |
| Bearing | 140 |
| Air Valve | 150 |
| Air Supply Inlet Assembly | 160 |
| Piston | 165 |
| USB Port | 170 |
| Communications Port, Flow Sensor & I/O Expansion | 172 |
| Communications Port, PLC & Factory Automation | 174 |
| Flash Drive | 175 |
| Cycle Switch | 180 |
| Cycle Switch Feedback Line to Controller | 190 |
| Contaminant Trap | 200 |
| Inlet side | 205 |
| Air Regulator | 210 |
| Air Lubricator | 220 |
| Pump Inlet | 230 |
| 3-Way Vent Valve | 233 |
| Vent Port | 234 |
| Pump Outlet | 240 |
| Return Port | 244 |
| 3-Digit Display | 245 |
| Pump Air Inlet | 250 |
| In-Cab Display | 260 |
| LED | 270 |
| Front Cover, Controller | 273 |
| Manual Lube Push-Button | 275 |
| UP Arrow | 280 |
| Information Processing System | 290 |
| Down Arrow | 300 |
| Left Arrow | 310 |
| Right Arrow | 320 |

-continued

| | |
|---|---|
| Flow Sensor/Transducer | 330 |
| Pressure Sensor/Transducer at Pump | 340 |
| Micro-Switch | 342 |
| Pressure Sensor/Transducer at End of Line | 345 |
| Feedback Line Pressure Sensor/Transducer | 346 |
| I/O Device | 350 |
| Cable Connection | 355 |
| Power Supply | 360 |
| Computer | 370 |
| PC Software | 380 |
| Data Log | 390 |
| Low Level | 400 |
| Remote Manual Lube | 420 |
| Standby/Ignition Switch | 430 |
| Secondary Timer | 440 |
| Post Spray | 450 |
| Alarm | 470 |
| Remote Sensor Controller | 490 |
| Slave Controller | 500 |
| I/O expansion Controller | 505 |
| Factory Automation Systems | 510 |
| PLC | 520 |
| Lubrication sensors | 530 |
| Single Line Lubrication System | 600 |
| Dual Line Lubrication System | 700 |
| Two Pump Single Line Lubrication System | 800 |
| Zoned Single Line Lubrication System | 900 |

The invention claimed is:

1. A lubrication system for lubricating bearings, the lubrication system comprising:
at least one lubrication pump for pumping lubricant to the bearings,
at least one metering valve for distributing the pumped lubricant throughout the lubrication system to the bearings, and
a lubrication controller in communication with the at least one lubrication pump and the at least one metering valve for controlling the at least one lubrication pump and for controlling the at least one metering valve, the lubrication controller having reprogrammable firmware configurable to cause hardware to perform specified tasks,
wherein the firmware is selectively reprogrammable from a first state in which the firmware is configured to selectively control a first system selected from a group consisting of a series progressive lubrication system, a dual line lubrication system and a single line parallel lubrication system to a second state in which the firmware is configured to selectively control a second system selected from the group consisting of a series progressive lubrication system, a dual line lubrication system and a single line parallel lubrication system,
wherein the first system is different than the second system.

* * * * *